United States Patent
Yip et al.

(10) Patent No.: US 6,793,339 B1
(45) Date of Patent: Sep. 21, 2004

(54) COATED SUNGLASS LENS

(75) Inventors: Brandon Yip, Blackwood (AU); Colin James Hall, South Brighton (AU); Frank Arnold Samson, Strathalbyn (AU); Brian Douglas Adams, Huntfield Heights (AU); Randy Lee Gove, Rohnert Park, CA (US)

(73) Assignee: Sola-International Holdings, Ltd., Lonsdale (AU)

( * ) Notice: Subject to any disclaimer, the term of this patent is extended or adjusted under 35 U.S.C. 154(b) by 0 days.

(21) Appl. No.: 09/403,608

(22) PCT Filed: Oct. 18, 1998

(86) PCT No.: PCT/AU98/00868

§ 371 (c)(1),
(2), (4) Date: Nov. 15, 2002

(87) PCT Pub. No.: WO99/21048

PCT Pub. Date: Apr. 29, 1999

(30) Foreign Application Priority Data

Oct. 21, 1997 (AU) .............................................. PO9950
Mar. 4, 1999 (AU) .............................................. PP8997

(51) Int. Cl.⁷ .............................. G02C 7/10; F21V 9/06; G02B 1/10
(52) U.S. Cl. ........................ 351/163; 351/51; 351/177; 359/360; 359/585
(58) Field of Search ................................ 351/163, 165, 351/166, 159, 177, 44, 45, 51; 359/585, 360

(56) References Cited

U.S. PATENT DOCUMENTS

| | | |
|---|---|---|
| 2,758,510 A | 8/1956 | Aüwärter |
| 3,679,291 A | 7/1972 | Apfel et al. |
| 3,901,997 A | 8/1975 | Groth |
| 3,936,579 A | 2/1976 | Ogasawara et al. |
| 3,990,784 A | 11/1976 | Gelber |
| 4,045,125 A * | 8/1977 | Farges ........................ 359/585 |
| 4,070,097 A | 1/1978 | Gelber |
| 4,169,655 A * | 10/1979 | Jacobsson ................... 359/360 |
| 4,217,038 A * | 8/1980 | Letter et al. ............ 351/160 R |
| 4,619,504 A * | 10/1986 | Daniels et al. .............. 351/163 |
| 4,679,918 A * | 7/1987 | Ace ............................ 351/163 |
| 4,793,669 A | 12/1988 | Perilloux |
| 4,802,755 A | 2/1989 | Hensler |
| 4,934,792 A * | 6/1990 | Tovi ............................ 359/896 |
| 4,954,591 A | 9/1990 | Belmares |
| 5,054,902 A | 10/1991 | King |
| 5,135,298 A | 8/1992 | Feltman |
| 5,407,733 A | 4/1995 | Bjornard et al. |
| 5,694,240 A | 12/1997 | Sternbergh |
| 5,729,323 A | 3/1998 | Arden et al. |
| 5,770,259 A | 6/1998 | Parker et al. |
| 5,846,650 A * | 12/1998 | Ko et al. .................... 428/336 |

FOREIGN PATENT DOCUMENTS

| | | |
|---|---|---|
| DE | 971398 | 1/1959 |
| IT | 1244374 | 1/1991 |
| WO | WO96/04216 | 2/1996 |
| WO | WO97/22894 | 6/1997 |

OTHER PUBLICATIONS

Baumeister, et al., "Optical Interference Coatings", Scientific American, Dec. 1970, pp. 59–75.

* cited by examiner

Primary Examiner—Scott J. Sugarman
Assistant Examiner—Deborah Raizen
(74) Attorney, Agent, or Firm—Burns, Doane, Swecker & Mathis, LLP

(57) ABSTRACT

An optical lens including an optically clear lens element; and a light absorbing coating on a surface of the lens that attenuates transmitted light; has a coloured or colourless reflection as seen from the front of the sunglass lens; and is anti-reflective as seen from the eye side of the lens.

27 Claims, 11 Drawing Sheets

Logo visible from front of sunglass lens

Logo invisible to wearer on antireflective side of coating

COATED SUNGLASS LENS

The present invention relates to optical articles bearing a light absorbing coating.

The optical articles according to the present invention are preferably employed in the preparation of articles such as optical lenses, including spectacle lenses, including sunglass lenses, visors, shields, glass sheets, protective screens, and the like.

Sunglasses generally serve to attenuate transmitted light, but aside from the level of light transmittance, there are other features that distinguish different sunglass lenses, such as material, transmitted colour, scratch resistance, reduction of side glare, ultra-violet transmittance, cosmetic appearance etc. Coatings may be applied to enhance the performance of sunglass lenses. Such coatings might include scratch resistant coatings, hydrophobic coatings for easier cleaning, anti-reflection coatings on the concave surface for reducing side glare or "mirror" (or "interference") coatings for producing fashionable lens colours. General purpose sunglass lenses should meet certain standard specifications, including luminous transmittance, traffic signal recognition and UV transmittance (e.g. ANSI Z80.1-1995).

In addition to their performance characteristics, sunglass lenses should be simple and economical to produce in a reliable manner.

As is known in the prior art, the preferred method for producing sunglass lenses is dependent on the material involved. In all cases a light-attenuating material is either incorporated into the substrate material or applied over its surface in a process known as "tinting". For example, glass lenses are often tinted by introducing coloured additives to the molten glass, and similarly polycarbonate lenses are injection-moulded from pre-coloured plastic granules. A disadvantage associated with this method of production is that for economical reasons, very large batches of coloured raw material must be purchased, limiting flexibility in the range of tint colours that can be offered in the sunglass lens product. Moreover, prescription sunglass lenses with highly varying thickness will also exhibit non-uniform transmittance when coloured in this way. Hard resin lenses (another commonly used ophthalmic plastic) are usually dipped in a hot, liquid dye which is imbibed into the plastic. This process also has disadvantages, such as difficulty in achieving tint uniformity, poor colour reproducibility and its requirement that if the lens has a scratch resistant coating, it must be semi-permeable to allow imbibation of the dye molecules, hence compromising the scratch resistance. If a reflective mirror coating is desired, the tinted substrate is then cleaned and coated in an evaporative box coater. Such multi-stage processes are both time-consuming and expensive.

One proposal in the prior art to overcome some of the problems associated with lens tinting is to apply the light absorbing material as a thin film on an essentially transparent substrate. U.S. Pat. No. 5,770,259 (Parker and Soane) describes a method for tinting sunglass lenses using a curable primer containing a tinting agent. Vacuum deposition allows the light absorbing coating to be applied in a relatively fast, clean, flexible and controllable manner. U.S. Pat. No. 5,729,323 (Arden and Cumbo) describes a sunglass formed by depositing a multi-layer light absorbing coating containing $TiO_x$ (x=0.2–1.5) on the concave surface of the substrate. The coating is anti-reflective from the wearer's side of the lens. U.S. Pat. No. 3,679,291 (Apfel and Gelber) describes a metal-dielectric multi-layer coating that is light absorbing and has an asymmetric reflectance, being anti-reflective from one side and with strong colour on the other side.

Another time-consuming step in the production of corrective sunglass lenses is the surfacing of the lenses. Corrective (or prescription) sunglass lenses are often dispensed using "semi-finished blanks"—lenses that have a pre-moulded front surface and a back surface that must be ground and polished to satisfy the individual wearer's corrective prescription. For plastic lenses in particular, tinting and the deposition of further lens coatings must be performed after surfacing the lens, resulting in a long and labour-intensive process to produce and deliver the sunglass lenses. One means to simplify and accelerate lens delivery is to employ a wafer lamination scheme, where front and back lens wafers spanning a large range of optical powers are simply glued together to produce a lens of virtually any desired prescription. Instead of maintaining a complex optical grinding and polishing workshop, the optical dispenser need only maintain an inventory of wafers and a lamination unit. The use of fast curing glues allows lenses to be produced in only minutes. Additional performance enhancing coatings may be applied to the wafers at the factory, so that the dispenser may provide the desired product features immediately, simply by selecting the appropriate wafers from his inventory.

For laminated lens wafer systems, for example of the Sola International Matrix®-type, liquid bath tinting is not a desired option—it is a low yield process involving significant handling and possible distortion of fragile wafers. Such tinted lenses may also exhibit poor abrasion and scratch resistance and variable depth of colour.

Moreover, for sunglass lenses in particular, it would be a significant advance in the art if, in addition, reflection of visible light at the concave (or rear) lens surface could be kept sufficiently low to avoid glare from incident light at the concave surface.

Accordingly, it is an object of the present invention to overcome, or at least alleviate, one or more of the difficulties or deficiencies related to the prior art.

Accordingly, in a first aspect of the present invention there is provided an optical lens including an optically clear lens element; and a light absorbing coating on the front surface of the lens that attenuates transmitted light;

has a coloured or colourless reflection as seen from the front of the sunglass lens; and is anti-reflective as seen from the eye side of the lens.

It will be understood that, in accordance with the present invention, one or more surfaces of an optical lens is coated with a light absorbing coating. This light absorbing coating may be applied to either the outside surface of the lens or an inside surface of a lens wafer (where it is protected from scratching once the wafers are laminated) as discussed below. The light absorbing coating may preferably serve three purposes at once—to attenuate transmitted light, effectively providing the sunglass "tint," to produce a reflected colour that is of pleasing appearance and to reduce or minimise back reflections seen by a wearer of the sunglass lenses.

In a preferred form, the light absorbing coating may function as a mirror coating. Thus, the tinting and mirror coating processes may be combined into one with this coating.

Further the deposited coating may exhibit much improved adhesion and thus improved abrasion resistance.

In a further aspect of the present invention there is provided an optical lens including an optically clear lens element; and a light absorbing coating on the rear surface of the lens, such that the light absorbing coating attenuates transmitted light;

has a coloured or colourless reflection as seen from the front of the sunglass lens; and is anti-reflective as seen from the eye side of the lens.

Preferably the light absorbing coating is an asymmetric reflectance, light absorbing coating including a plurality of overlapping light absorbing and generally transparent layers, and wherein the thickness and/or number of the respective layers are selected to provide an anti-reflective effect on the eye side of the optical lens and a desired colour on the other side of the lens.

By the term "coloured or colourless reflection", as used herein, we mean, that light from a white fluorescent source is reflected from the surface of the optical lens to an observer such that the reflected light is coloured or white respectively.

By the term "asymmetric reflectance", as used herein, we mean that the multi-layer coating renders the lens anti-reflective when viewed from one side of the coating and exhibits a selected colour or colourless reflection when viewed from the other side.

The optically clear lens element may be a sunglass lens, ophthalmic lens element, visor or the like. A sunglass lens is preferred.

By the term "ophthalmic lens element", as used herein, we mean all forms of individual refractive optical bodies employed in the ophthalmic arts, including, but not limited to, lenses, lens wafers and semi-finished lens blanks requiring further finishing to a particular patient's prescription.

Where the optically clear lens element is an ophthalmic lens element, the ophthalmic lenses may be formed from a variety of different lens materials, and particularly from a number of different polymeric plastic resins. A common ophthalmic lens material is diethylene glycol bis (allyl carbonate). Lens materials with higher refractive indices are now growing in popularity. One such material is a CR39® (PPG Industries). Other high index lens materials are based on acrylic or allylic versions of bisphenols or allyl phthalates and the like. Other examples of lens materials that may be suitable for use with the invention include other acrylics, other allylics, styrenics, polycarbonates, vinylics, polyesters and the like.

The light absorbing coating may be formed from overlapping light absorbing and generally transparent layers, as discussed above. Desirably the light absorbing coating is formed from alternating transparent and absorbing layers.

The number and/or thickness of the light absorbing and generally transparent layers may be selected to provide an eye side anti-reflective coating utilising suitable computer software.

The combination of light absorbing and transparent layers may be selected to provide a bright, coloured reflection when viewed from the front of the lens at the same time. A mirror type coating may be produced.

The transparent layers may be formed from any suitable optically clear material. The transparent layers may be formed of a dielectric material. Preferably the dielectric layers may be formed from metal oxides, fluorides or nitrides. Metal oxides which may be used for forming transparent layers include one or more of SiO, $SiO_2$, $ZrO_2$, $Al_2O_3$, TiO, $TiO_2$, $Ti_2O_3$, $Y_2O_3$, $Yb_2O_3$, MgO, $Ta_2O_5$, $CeO_2$ and $HfO_2$. Fluorides which may be used include one or more of $MgF_2$, $AlF_3$, $BaF_2$, $CaF_2$, $Na_3AlF_6$, $Ta_2O_5$, and $Na_5Al_3Fl_{14}$. Suitable nitrides include $Si_3N_4$ and AlN.

A silica ($SiO_2$) material is preferred.

In a particularly preferred embodiment, the first deposited layer may be a silica layer followed by alternating light absorbing and generally transparent, preferably silica, layers. The transparent dielectric layers may be substantially thicker than the light absorbing or metallic layers. The first layer may be of approximately 10 to 75 nm, preferably approximately 25 to 60 nm. This first layer may provide significant improvement in the abrasion resistance of the multi-layer coating.

The generally transparent layers within the body of the light absorbing coating may be relatively thick. The thicknesses may be such as to generate interference effects which substantially cancel out internal reflections. Thicknesses of for example from approximately 20 nm to 100 nm, preferably approximately 25 nm to 85 nm may be used.

The light absorbing layers of the light absorbing coating may be formed from any suitable material. Metals, metal oxides or nitrides may be used.

Desirably a metallic layer may be selected to provide a generally neutral, e.g. grey transmission. Accordingly a silver-coloured metal, e.g. Niobium (Nb), Chromium (Cr), Tungsten (W), Tantalum (Ta), Tin (Sn), Palladium (Pd), Nickel (Ni) or Titanium (Ti) or mixtures thereof may be used.

The thickness of the light absorbing layers is such as to attenuate transmitted light. The light absorbing or metallic layers may generally be of a substantially reduced thickness relative to the transparent or dielectric layers. For example if the material used is Niobium, the light absorbing layers may be from approximately 1 nm to 10 nm, preferably approximately 2 nm to 5 nm in thickness.

In a preferred form, the light absorbing coating may include a total of 4 to 12 alternating light absorbing-generally transparent layers, preferably 6 to 8 alternating layers. An additional primer layer may be included, as discussed above.

The resultant coating may exhibit a silver (colourless) mirror-type appearance. Alternatively the light absorbing coating may be modified to produce a different colour coating. For example a metallic oxide, e.g. silica or niobium oxide coating may be applied. A combination of dielectric top coatings may be applied. A silica top coat may be added to modify colour and additionally enhance abrasion resistance.

Accordingly in a preferred form, the light absorbing coating includes alternating layers of a dielectric material and a metallic material;

the dielectric material being selected from one or more of SiO, $SiO_2$, $ZrO_2$, $Al_2O_3$, TiO, $TiO_2$, $Ti_2O_3$, $Y_2O_3$, $Yb_2O_3$, MgO, $Ta_2O_5$, $CeO_2$ and $HfO_2$, $MgF_2$ $AlF_3$, $BaF_2$, $CaF_2$, $Na_3AlF_6$, $Ta_2O_5$ and $Na_5Al_3Fl_{14}$; and $Si_3N_4$ and AlN; and the metallic material is selected from the metals, metal oxides or nitrides of one or more of Niobium (Nb), Chromium (Cr), Tungsten (W), Tantalum (Ta), Tin (Sn), Palladium (Pd), Nickel (Ni) or Titanium (hi).

More preferably the light absorbing coating includes alternating layers of silica ($SiO_2$) and chromium metal.

More preferably the light absorbing coating includes an additional titanium dioxide layer or layers of such a thickness to provide a desired colour to the optical lens.

Alternatively, the light absorbing coating includes alternating layers of silica and niobium metal.

Preferably the light absorbing coating includes an additional niobium oxide ($Nb_2O_5$) and/or silica ($SiO_2$) layer of such thicknesses to provide a desired colour to the optical lens.

In a still further preferred embodiment the light absorbing coating further includes compatible dielectric layers of suitable thickness to provide a desired colour to the optical lens.

The optical lens may further include one or more additional coatings.

Accordingly in a further aspect of the present invention there is provided a multi-coated optical lens including an optical article; and a light-absorbing coating deposited on at least one surface of the optically clear article; the light-absorbing coating including a plurality of overlapping light absorbing and generally transparent layers, and wherein the thickness and/or number of the respective layers being selected to provide an anti-reflective effect on the eye side of the optical lens and a desired colour on the other side of the optical lens, and an optically clear secondary coating which provides a desirable optical and/or mechanical property to the optical article.

The optically clear secondary coating may preferably underlay or overlay the light absorbing coating.

The secondary coating may be of any suitable type. The secondary coating may be one or more of an anti-reflective, abrasion resistant, or impact-resistant coating. An abrasion-resistant coating is preferred. The combination of an abrasion resistant coating and an anti-reflective coating is particularly preferred.

An abrasion-resistant (hard) coating including an organosilicone resin is preferred. A typical organosilicone resin that is suitable for use in the present invention has a composition comprising one or more of the following:

1) organosilane compounds with functional and/or non-functional groups such as glycidoxypropyl trimethoxy silane;

2) co-reactants for functional groups of functional organosilanes, such as organic epoxies, amines, organic acids, organic anhydrides, imines, amides, ketamines, acrylics, and isocyanates; colloidal silica, sols and/or metal and non-metal oxide sols; catalysts for silanol condensation, such as dibutylin dilaurate;

3) solvents such as water, alcohols, and ketones;

4) other additives, such as fillers.

Abrasion resistant coats of acrylic, urethane, melamine, and the like may also be used. These materials, however, frequently do not have the good abrasion resistant properties of organo-silicone hard coatings.

The abrasion-resistant (hard) coating may be coated by conventional methods such as dip coating, spray coating, spin coating, flow coating and the like or by newer methods such as Plasma Enhanced Chemical Vapour Deposition. Coating thicknesses of between approximately 0.5 and 10 microns are preferred for abrasion and other properties.

The secondary abrasion resistant coating may be applied to the front and/or rear lens surfaces. The abrasion resistant coating may be of the type described in U.S. Pat. No. 4,954,591, the entire disclosure of which is incorporated herein by reference.

In a preferred aspect, one or both surfaces of the optical article may be subjected to a surface treatment to improve bondability and/or compatibility of the light absorbing and/or secondary coating. The surface treatment may be selected from one or more of the group consisting of plasma discharge, corona discharge, glow discharge, ionising radiation, UV radiation, flame treatment and laser, preferably excimer laser treatment. A plasma discharge treatment is preferred. The surface treatment, alternatively or in addition, may include incorporating another bonding layer, for example a layer including a metal or metal compound selected from the group consisting of one or more of Chromium, Nickel, Tin, Palladium, Silicon, and/or oxides thereof.

The optical article may be a sunglass lens of the wrap-around or visor type, for example of the type described in U.S. Pat. No. 6,361,166, the entire disclosure of which is incorporated herein by reference.

In a further aspect of the present invention, there is provided a method for preparing an optical lens, which method includes providing
an optically clear lens element; and
a light absorbing coating on the front surface of the lens that
attenuates transmitted light;
has a coloured or colourless reflection as seen from the front of the sunglass lens; and
is anti-reflective as seen from the eye side of the lens; and depositing the light absorbing coating on a surface of the optical lens element.

According to the present invention it has been found that, following the method mentioned above, it is possible to achieve a relatively thin, light absorbing coating with consequent advantages in both optical and mechanical properties.

Preferably the method further includes providing
an optically clear lens element,
a light absorbing material, and
a generally transparent material;

depositing overlapping layers of light absorbing material and generally transparent material on a surface of the optical lens element, the number and/or thickness of the respective layers being selected to provide a desired colour to the front surface of the optical lens and an anti-reflective effect on the eye side of the optical lens.

In a preferred aspect the light absorbing or metallic material and generally transparent or dielectric material, preferably Nb and $SiO_2$ or Cr and $SiO_2$, are deposited as alternating layers.

The deposition step may be a vacuum deposition step. The deposition step may be conducted in a coating apparatus. A box coater or sputter coater may be used.

The light absorbing coating may preferably be formed on the surfaces of the substrate according to the process and the box coaters as described in the Italian Patent No. 1.244.374 the entire disclosure of which is incorporated herein by reference.

In accordance with said method, the various layers of the light absorbing coating may be deposited in subsequent steps utilising a vacuum evaporation technique and exposing the growing layers to a bombardment of a beam of ions of inert gas.

Moreover, in accordance with the preferred method, the deposition of the layers may be achieve d at a low temperature (generally below 80° C.), using an ion beam having a medium intensity (meaning the average number of ions that reach the substrate) included between approximately 30 and 100 $\mu A/cm2$ and the energy included between approximately 50 and 100 eV.

Preferably, the optical article is maintained at an elevated temperature during the deposition of the various layers of the light absorbing coating.

More preferably the optically clear lens element includes
  a front lens wafer including
    a contact surface,
  a complementary back lens wafer, including
    a contact surface
  and the overlapping layers of light absorbing material and generally transparent material are deposited on a surface of the front and/or complementary back lens wafer.

A laminate adhesive may be applied to one or both contact surfaces, the front lens wafer and back lens wafer being brought into contact and the laminate so formed being subjected to a curing step to form a laminate optical lens.

In a further preferred aspect of the present invention, there is provided an optical lens element including
  a lens wafer having
    a first lens surface; and
    a second lens surface,
  the first or second surface having deposited thereon
  a light absorbing coating that
    attenuates transmitted light;
    has a coloured or colourless reflection as seen from the front of the sunglass lens; and
    is anti-reflective as seen from the eye side of the lens.

Preferably the light absorbing coating is an asymmetric reflectance light absorbing coating including a plurality of overlapping light absorbing and generally transparent layers; the thickness and/or number of the respective layers being selected to provide a desired colour to the optical lens element and an anti-reflective effect on the eye side of the lens element after lamination of the lens wafer.

The coated lens wafer may be a front surface wafer or a rear surface wafer. Where the coated lens wafer is a front surface wafer the light absorbing coating may be deposited on the first (front) or second (rear) lens surface thereof.

Where the coated lens wafer is a rear surface wafer, the light absorbing coating is preferably deposited on the first (front) surface thereof.

Accordingly in a still further aspect of the present invention, there is provided a laminate optical lens including
  a front lens wafer including
    a contact surface;
  a complementary back lens wafer including
    a contact surface; and
  a light absorbing coating deposited on a contact surface, which light absorbing coating
    attenuates transmitted light;
    has a coloured or colourless reflection as seen from the front of the sunglass lens; and
    is anti-reflective as seen from the eye side of the lens.

Preferably the light absorbing coating includes a plurality of overlapping light absorbing and generally transparent layers; the thickness and/or number of the respective layers being selected to provide a desired colour to the laminate optical lens and an anti-reflective effect on the eye side of the laminate optical lens, as discussed above.

It will be understood that, in this embodiment, in addition to the advantages of the present invention described above, the light absorbing coating provided may be protected by the optical lens wafers themselves and is thus virtually indestructible.

In addition, abrasion resistant and like coatings of the type described above may be applied to the external surfaces of the laminate optical article.

The laminate optical article may be fabricated in a manner similar to that described in U.S. Pat. No. 6,256,152, the entire disclosure of which is incorporated herein by reference.

Where the light absorbing coating is applied Inside the laminate, particularly for hard resin lenses, because the lens is not tinted in a liquid bath, the scratch resistant coating applied to the exterior of the wafers does not need to be semi-permeable (to allow passage of the tint molecules through to the substrate). Therefore, the most durable, non-tintable scratch resistant coatings may be applied and the final product is extremely durable. The light absorbing coating is protected inside the laminate and cannot be scratched. Because the light absorbing coating is located approximately in the centre of the laminate, when the lens is edged for mounting into spectacle frames, the edges appear "dark" and it is difficult to discern that the "tinted" appearance of the lens is due only to a very thin coating. Finally, as can be seen in FIG. 2 below, there is a double reflection from the front of the lens, one "white" reflection from the front of the front wafer and one coloured reflection from the light absorbing coating inside the laminate. If the front wafer is thin and has no optical power, the two reflections overlay one another and only a single reflection is observed. However, if the front wafer is thick and has surfaces of different curvature, then the two front reflections become apparent. A quite pleasing "glossy" effect is obtained.

Before the lens wafers of the laminate lens are bonded, they may be too thin to meet United States F.D.A impact requirements. A sunglass wearer may be put at risk if he wears sunglasses which have been made using only the front or back wafer of the laminate. It may be necessary for a prescription sunglass manufacturer to ensure that non-laminated wafers are not mounted in sunglass frames for general use. One way to achieve this end is to ensure that the lens wafers are visibly identified with a warning symbol as unsuitable for use, in such a way that after the wafers are laminated, the warning is no longer visible. For example, the current Matrix® lens lamination system includes a warning symbol in the centre of the contact surface of each lens wafer—a roughened area of the surface that causes unacceptable disturbance of the wearer's vision and thus effectively prevents use of non-laminated wafers alone in spectacles. However, when the wafers are laminated using an adhesive of refractive index suitably matched to the lens material, the interface corresponding to the roughened surfaces optically disappears, so that the warning symbol is no longer visible.

If the light absorbing coating is applied over such a roughened contact surface, it is visible from the front of the wafer. It is also visible from the back of the wafer, because until the wafer is laminated, it is exposed to air rather than another lens wafer, so the coating does not perform antireflectively as designed. The roughened surface causes substantial light scattering toward the wearer and significantly disturbs his vision, so much so that the front lens wafer would not conceivably be used in a non-laminated state as a sunglass lens. After lamination, the coating is antireflective when viewed from the rear—light scattering from the roughened surface is very weak and so the roughened area is invisible to the wearer. If the contact surface of the lens wafer is roughened in a cosmetically pleasing fashion, then not only are non laminated lens wafers clearly identified, but after the coated wafers are laminated, a logo that is visible from the front of the lens but yet does not disturb the wearer's vision results.

Accordingly, in a preferred embodiment of the present invention a contact surface of the front and/or back lens wafer bears a mark thereon, the mark being substantially visible from both sides of the wafer before lamination, but which becomes substantially invisible from the eye side of the finished laminate lens. Preferably the mark on the contact surface is visible from the front of the laminated lens.

In an alternative embodiment where the mark on the contact surface is not visible from the front of the final laminated lens, the light absorbing coating includes a silica top layer, the silica top layer bearing a mark visible prior to lamination, as discussed above.

Preferably the visible mark is rendered substantially invisible when the lens wafer is contacted with a laminate adhesive having a refractive index approximately equal to that of the silica layer.

The light absorbing coating may for example be purposefully constructed to have a top layer of silica, which has a refractive index of approximately n=1.47. An excimer laser or other etching technique can be applied to remove (or merely reduce the thickness of) the top silica layer of part of the coating in the form of a warning label, which will be very visible before the wafer is laminated. However, after lamination, glue will fill the depressions caused by the etching, and because the glue can be chosen to have a refractive index very close to that of silica, the etched markings will have no optical effect and hence disappear, making the laminated lens suitable for use.

Alternatively, instead of removing past of the top silica layer, a warning label may be deposited on top of the silica layer with a suitably index-matched material, for example an adhesive or polymer material. Again, after lamination, glue will fill the void around the raised warning label, and because the glue can be chosen to have a refractive index very close to that of silica and the label itself, the warning marking will have no optical effect and hence disappear, making the laminated lens suitable for use.

Further characteristics and advantages of the present invention will be apparent from the following description of drawings and examples of embodiments of the present invention, given as indicative but not restrictive.

EXAMPLE 1

Light Absorbing Coating on the Inside of a Laminated Lens

Figure 1:
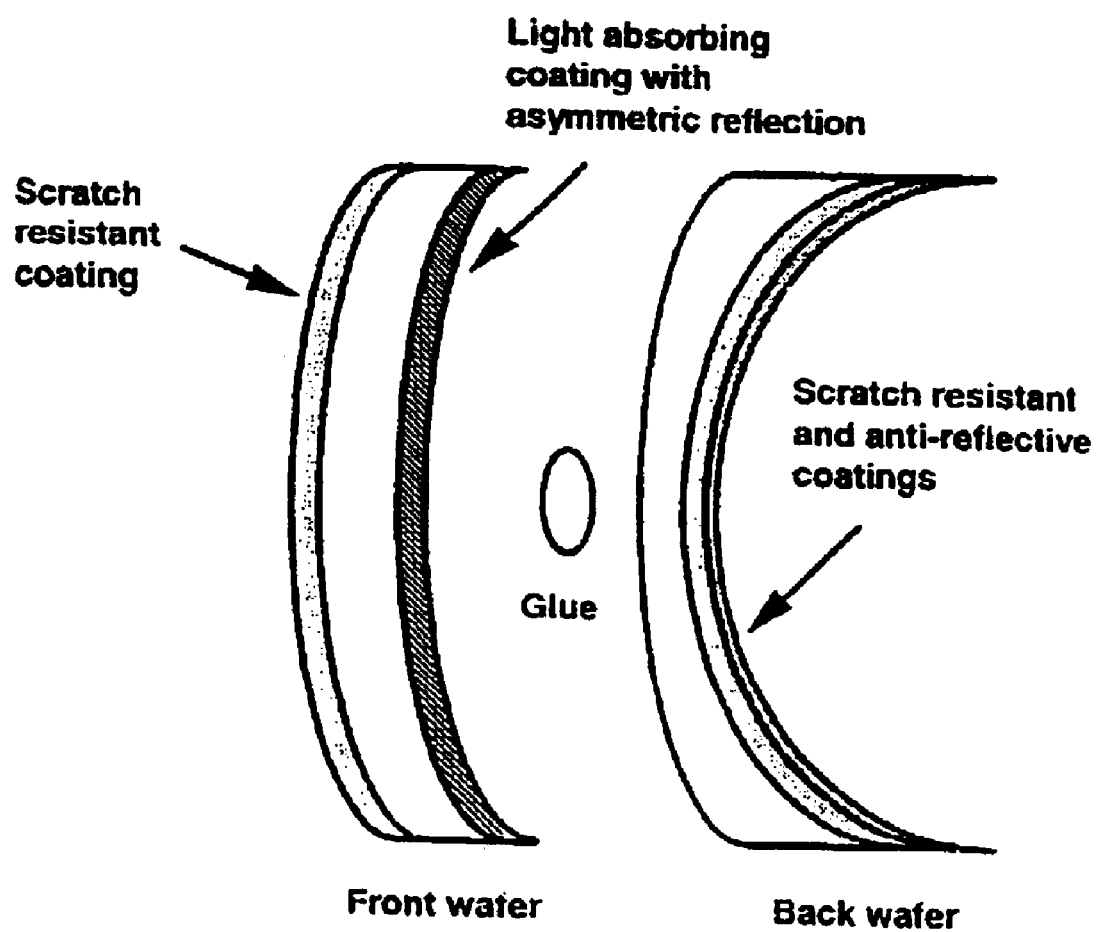
FIG. 1 illustrates an embodiment of a sunglass lens according to the present invention with the light absorbing coating inside the laminate.

FIG. 1 shows a preferred embodiment of a tinted optical lens according to the present invention. The front and back lens wafers are hard resin plastic wafers from a commercial ophthalmic lens system (Sola International Matrix® system). The back lens wafer is supplied with its external surface pre-coated with a scratch resistant and anti-reflective coating. The external surface of the front wafer is also treated with a scratch resistant coating. The internal surfaces of both waters are of uncoated hard resin.

Figure 2:
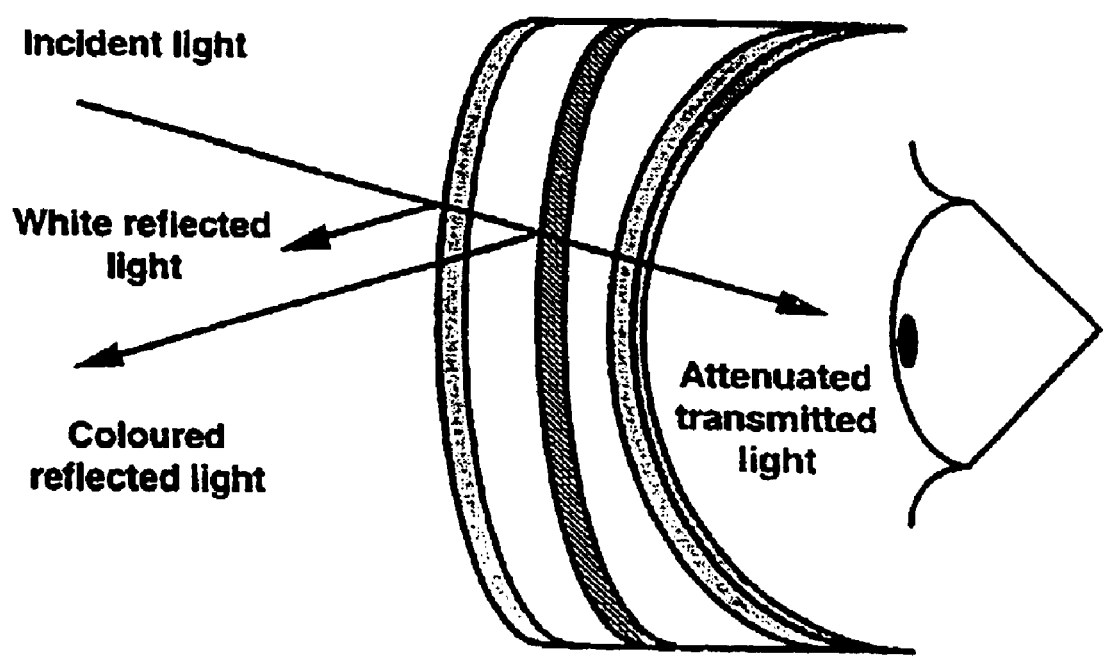
FIG. 2 illustrates the attenuation of transmitted light through the sunglass lens of FIG. 1 from a forward light source.
Figure 3:
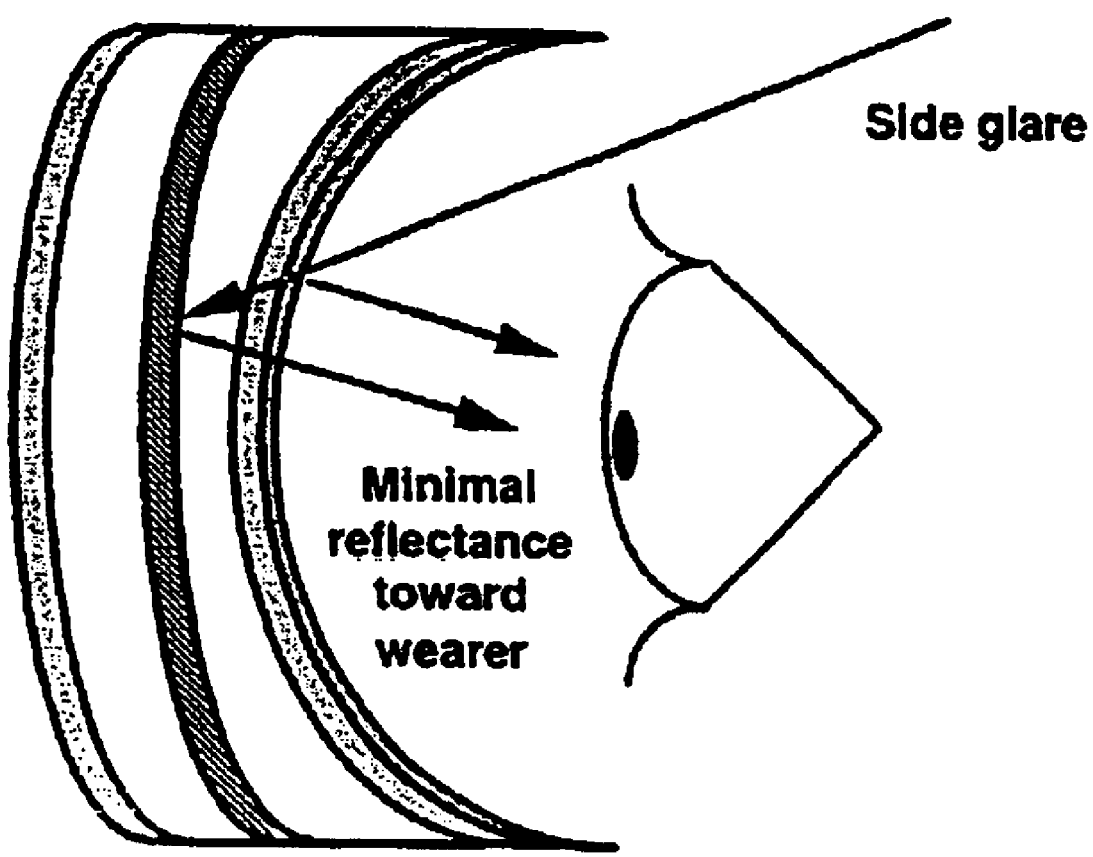
FIG. 3 illustrates the attenuation of reflected light from the sunglass lens of FIG. 1 from side glare.

A light absorbing coating with asymmetric reflectance is applied to the interface surface of the front wafer. (It may equally well be applied to the internal surface of the back wafer instead. Only the first case will be discussed for simplicity.) The coating is designed so that when the waters are laminated, neutral attenuation of transmitted light, an aesthetically pleasing colour when viewed from the front of the lens and anti-reflection from the wearer-side of the lens result, as shown in FIGS. 2 and 3. Referring to FIG. 3, it will be appreciated that possible reflections from surfaces behind the light absorbing coating do not contribute in any significant manner, because their intensity is severely reduced by the incident light having initially passed through the light absorbing coating. Such reflections are therefore not indicated in the figure.

The multi-layer light absorbing coatings consist of layers of absorbing materials and transparent dielectrics. The layers of absorbing material provide the attenuation of transmitted light. The degree of attenuation is controlled by adjusting the total thickness of these layers. If the absorbing material has a neutral transmission spectrum (as do many metals), the transmission of the coating will also be neutral, which is highly desirable for a sunglass lens that does not distort colour vision. By appropriately selecting the thicknesses of the various layers (which today is commonly achieved with the aid of computer software packages), the reflectance of the coating may be designed to have the required properties of a pleasing colour when viewed from the front of the lens and anti-reflection from the wearer side.

Table 1 lists the materials and layer thicknesses used in three differently embodiments of the light absorbing coating. The coatings were using a commercial evaporative box coater (Satis 1200).

TABLE 1

Composition of three differently coloured embodiments of the light absorbing coating as deposited inside the laminated sunglass lens.

| | Layers | | Thickness (nm) | | |
|---|---|---|---|---|---|
| Number | Material | Primary function | Bronze | Blue | Black |
| Substrate | | | | | |
| 1 | Cr | Adhesion to substrate | 0.5 | 0.5 | 0.5 |
| 2 | $TiO_2$ | Front colour | 37 | 35 | 20 |
| 3 | $SiO_2$ | Front colour | 9 | 50 | 20 |
| 4 | $TiO_2$ | Front colour | 88 | — | 20 |
| 5 | Cr | Absorption | 14 | 12 | 12 |
| 6 | $SiO_2$ | Back AR | 65 | 65 | 65 |

TABLE 1-continued

Composition of three differently coloured
embodiments of the light absorbing coating
as deposited inside the laminated sunglass lens.

| Layers | | | Thickness (nm) | | |
|---|---|---|---|---|---|
| Number | Material | Primary function | Bronze | Blue | Black |
| 7 | Cr | Absorption | 9 | 9 | 9 |
| 8 | SiO$_2$ | Back AR | 85 | 85 | 85 |
| 9 | Cr | Absorption | 2.5 | 2.5 | 2.5 |
| 10 | SiO$_2$ | Scratch resistance | 5 | 5 | 5 |

The sequence of layers is relative to a light ray entering the front surface of the optical lens.

Table 2 shows the optical performance of the sunglass lenses in transmittance.

TABLE 2

Optical performance of the sunglass lenses in transmission.

| Transmission | Bronze | Blue | Black |
|---|---|---|---|
| Luminous transmittance (%) | 12.1 | 11.4 | 13.5 |
| CIE x coordinate (illum. C) | 0.36 | 0.38 | 0.37 |
| CIE y coordinate (illum. C) | 0.35 | 0.37 | 0.35 |
| Av. UVB transmittance (%) | 0 | 0 | 0 |
| Av. UVA transmittance (%) | 1.8 | 1.4 | 2.2 |
| Red traffic signal trans. (%) | 16.3 | 16.3 | 18.1 |
| Yellow traffic signal trans. (%) | 13.6 | 13.3 | 15.3 |
| Green traffic signal trans. (%) | 11.1 | 10.1 | 12.3 |
| ANSI Standard Z80.3 - 1997 | yes | yes | yes |

Figure 4:
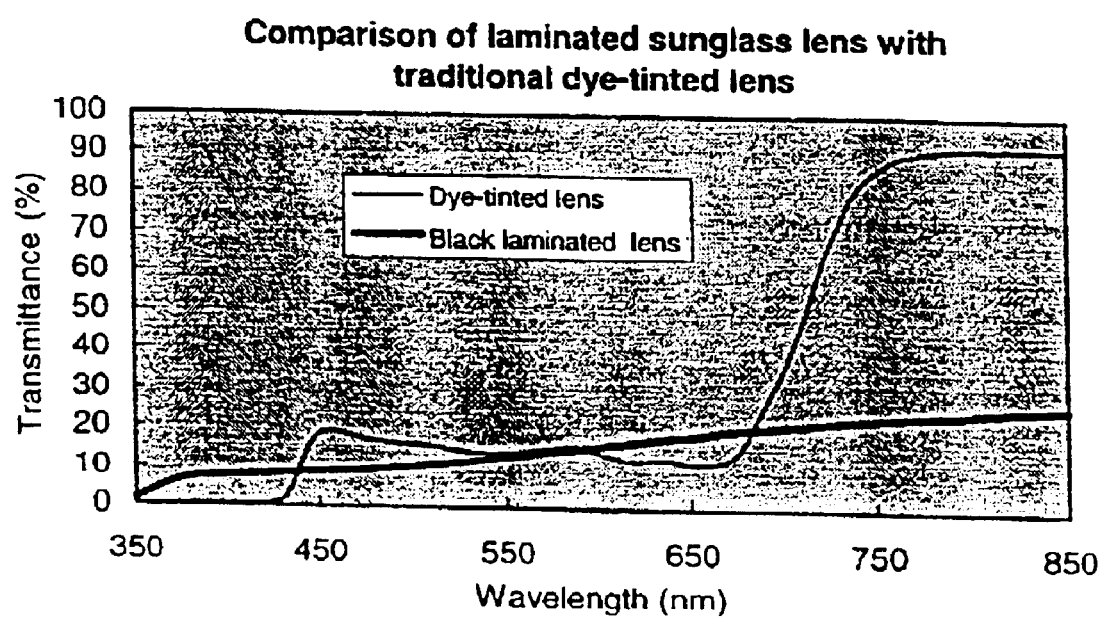
FIG. 4 illustrates the transmission spectra of a "black" laminated lens (see Table 1), as compared to a typical liquid-dye tinted hard resin sunglass lens.

As shown in FIG. 4, where the transmission spectrum of the black-coloured sunglass lens is compared to a hard resin sunglass lens tinted by the traditional liquid dye tinting process, the light absorbing coating has a quite neutral transmission, which provides excellent colour vision.

Table 3 shows the reflectance characteristics of the laminated sunglass lenses. As seen from the wearer-side reflectances, the sunglass lenses are indeed quite anti-reflective of side glare.

TABLE 3

Optical performance of the sunglass lenses in reflection.

| Sunglass lens reflectance | Bronze | Blue | Black |
|---|---|---|---|
| Front side | | | |
| Luminous reflectance (%) | 8.6 | 15.8 | 4.5 |
| CIE coordinate (illuminant C), x | 0.36 | 0.23 | 0.26 |
| CIE coordinate (illuminant C), y | 0.35 | 0.23 | 0.24 |
| Wearer side | | | |
| Luminous reflectance (%) | 0.9 | 1.0 | 1.1 |
| CIE coordinate (illuminant C), x | 0.30 | 0.25 | 0.26 |
| CIE coordinate (illuminant C), y | 0.31 | 0.24 | 0.29 |

EXAMPLE 2

Figure 5:
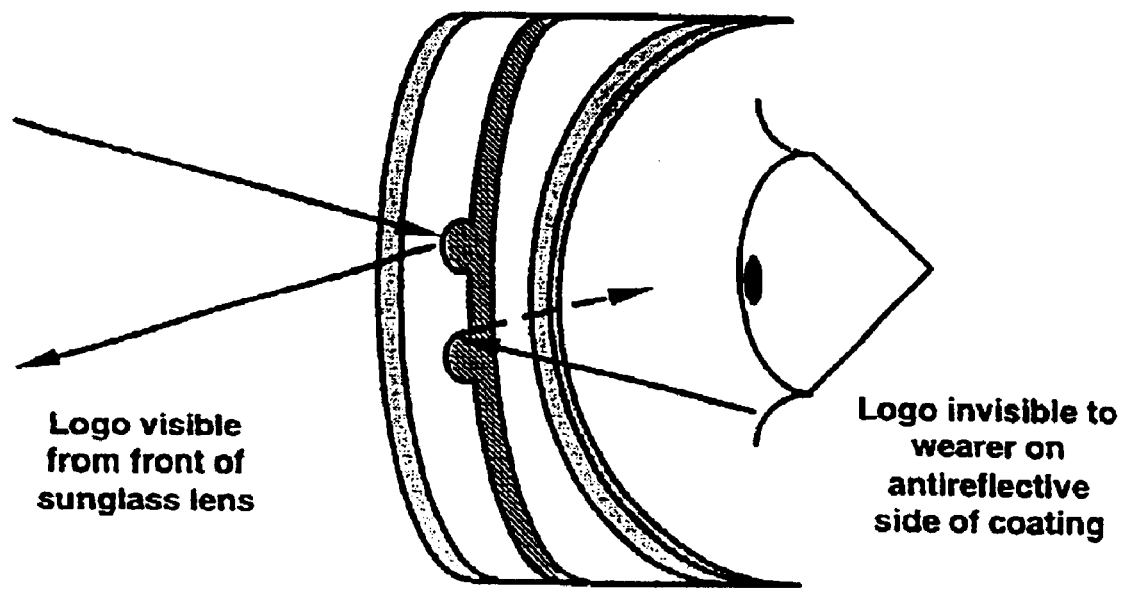
FIG. 5 illustrates an embodiment of a laminated sunglass lens with semi-visible internal markings.

In the embodiment of the present invention illustrated in Example 1 (with the light absorbing coating inside the laminate), it is possible to produce semi-visible markings or logos on the sunglass lenses, as shown in FIG. 5. By artificially roughening the surface of the wafer on the interface surface underneath the light absorbing coating (for example by etching the mould from which the internal surface of the front wafer is cast in this case), patterns are created and embedded inside the lens after lamination. The roughened surface is visible from the front of the sunglass lens, because from this side of the light absorbing coating, the reflectance is non-negligible, so light is scattered from the roughened surface. From the wearer side, because the coating is anti-reflective, reflections from the roughened surface are extremely weak, so that the markings are almost impossible to see. Therefore the logo can even be placed in the optical centre of the lens without disturbing the wearer's vision.

EXAMPLE 3

Figure 6:
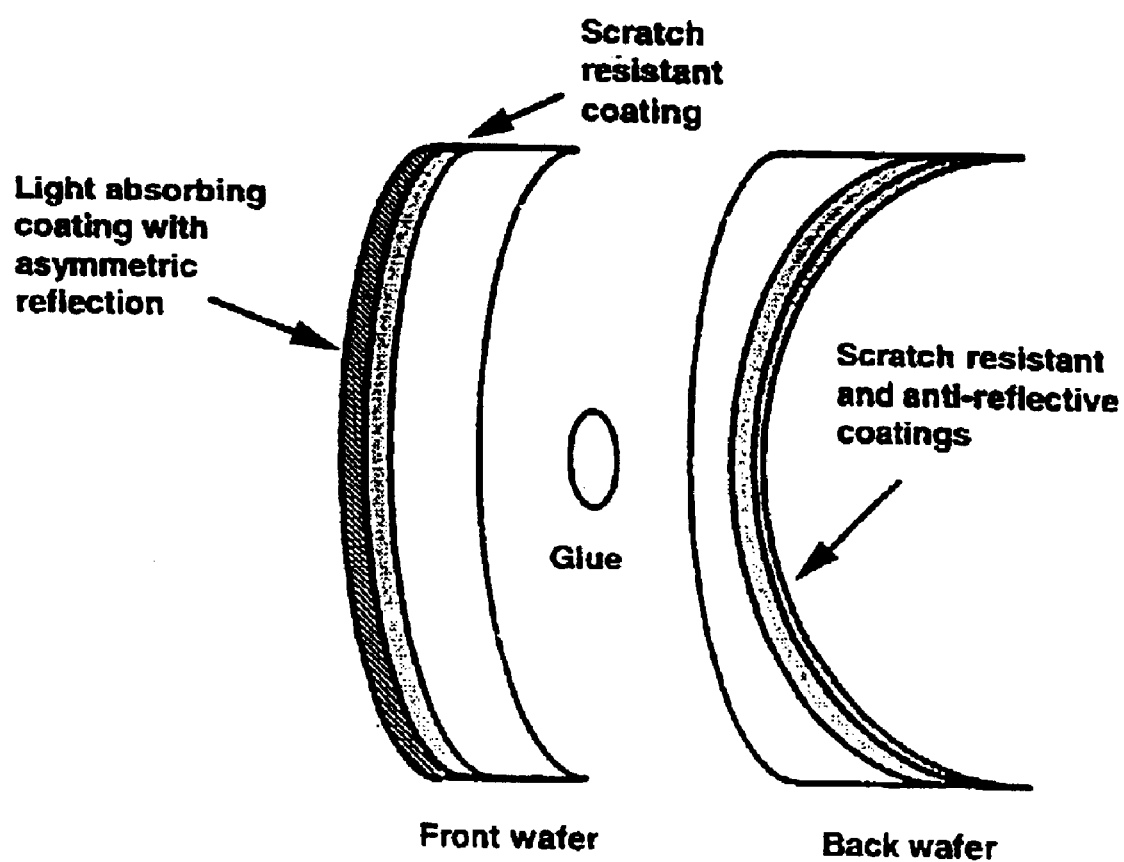
FIG. 6 illustrates an embodiment of a sunglass lens according to the present invention with the light absorbing coating on the outside surface of the front wafer.

Light Absorbing Coating on the Outside Surface of the Front Wafer of a Laminated Lens FIG. 6 shows another preferred embodiment of the sunglass lens. Again, the front and back lens wafers are hard resin plastic wafers from a commercial ophthalmic lens system (Sola International Matrix® system). The back wafer is supplied with its external surface pre-coated with a scratch resistant and anti-reflective coating. The external surface of the front wafer is also treated with a scratch resistant coating. The internal surfaces of both wafers are of uncoated hard resin.

Figure 7:
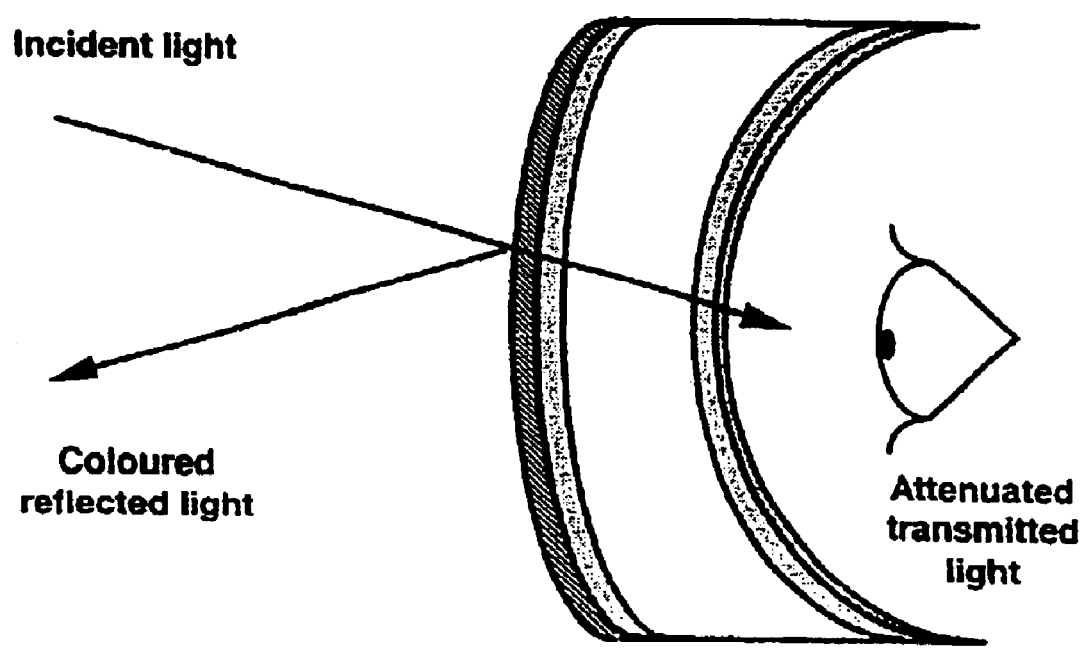
FIG. 7 illustrates the attenuation of transmitted light through the sunglass lens of FIG. 6 from a forward light source.
Figure 8:
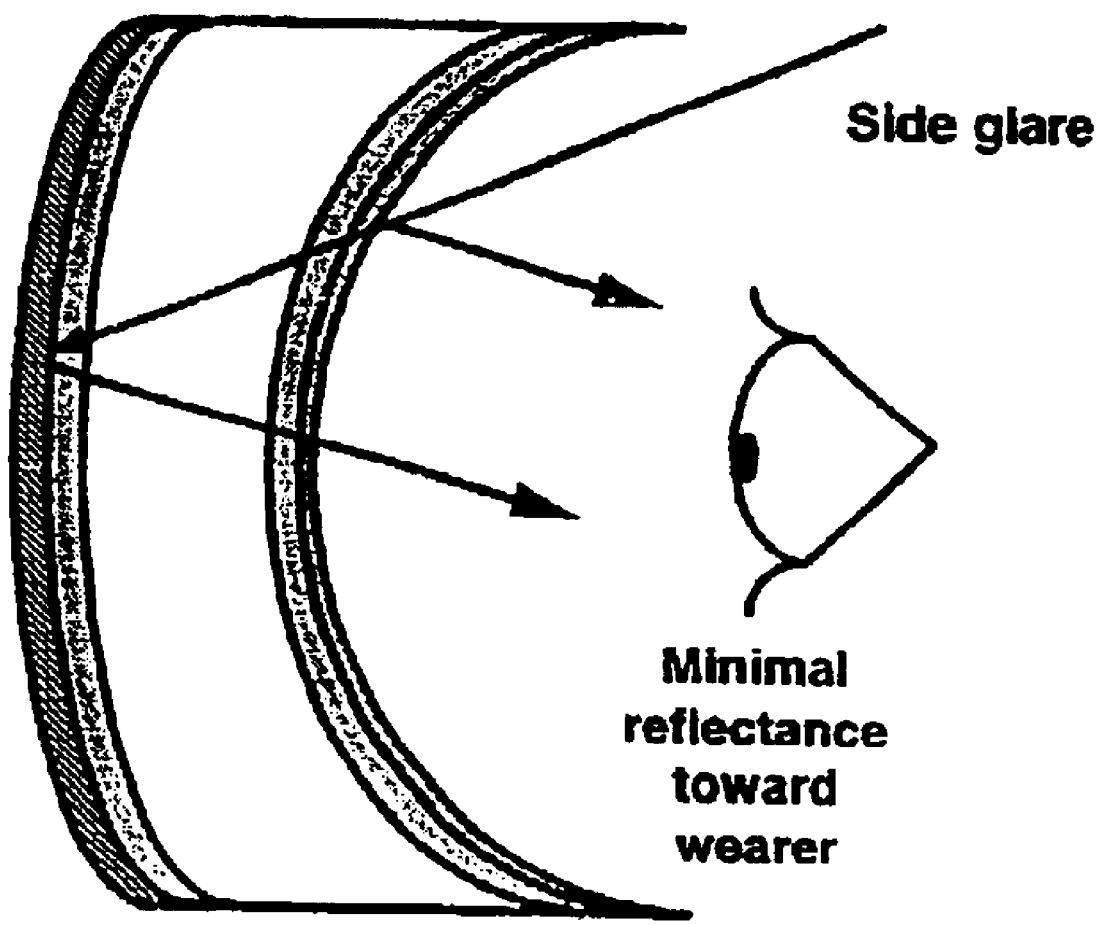
FIG. 8 Illustrates the attenuation of reflected light from the sunglass lens of FIG. 6 from side glare.

In this embodiment, the light absorbing coating with asymmetric reflectance is applied to the outside surface of the front wafer. Neutral attenuation of transmitted light, an aesthetically pleasing colour when viewed from the front of the lens and anti-reflection from the wearer-side of the lens again result after the wafers are laminated, as shown in FIGS. 7 and 8.

Table 4 lists the materials and approximate layer thicknesses used in four differently coloured embodiments of the light absorbing coating. The coatings in this case were deposited using a thin film sputter deposition system.

TABLE 4

Composition of four differently coloured
embodiments of the light absorbing coating
as deposited on the outside surface
of the front lens wafer.

| Layers | | | Thickness (nm) | | | |
|---|---|---|---|---|---|---|
| Number | Material | Primary function | Silver | Gold | Blue | Copper |
| Substrate | | | | | | |
| 1 | SiO$_2$ | Scratch resistance | 50 | 50 | 50 | 50 |
| 2 | Nb | Absorption | 2 | 2 | 2 | 2 |
| 3 | Si | Back AR | 80 | 80 | 80 | 80 |
| 4 | Nb | Absorption | 4 | 4 | 4 | 4 |
| 5 | Si | Back AR | 80 | 80 | 65 | 65 |
| 6 | Nb | Absorption | 4 | 4 | 4 | 4 |
| 7 | SiO$_2$ | Back AR | 40 | 40 | 20 | 40 |
| 8 | Nb | Absorption | 4 | 4 | 4 | 4 |
| 9 | SiO$_2$ | Back AR, front colour | | 10 | 40 | 10 |
| 10 | Nb$_2$O$_5$ | Front colour | | 10 | 30 | 30 |
| 11 | SiO$_2$ | Front colour | 25 | 30 | 30 | 60 |

Table 5 shows the optical performance of the sunglass lenses in transmittance.

TABLE 5

Optical performance of the sunglass lenses in transmission.

| Transmission | Silver | Gold | Blue | Copper |
|---|---|---|---|---|
| Luminous transmittance (%) | 13.2 | 15.8 | 17.6 | 21.8 |
| CIE x coordinate (illum. C) | 0.33 | 0.33 | 0.36 | 0.33 |
| CIE y coordinate (illum. C) | 0.33 | 0.33 | 0.36 | 0.34 |
| Av. UVB transmittance (%) | 0.0 | 0.0 | 1.0 | 0.3 |
| Av. UVA transmittance (%) | 1.3 | 1.3 | 2.2 | 4.8 |
| Red traffic signal trans. (%) | 15.2 | 18.0 | 22.3 | 24.8 |
| Yellow traffic signal trans. (%) | 14.0 | 16.6 | 19.5 | 23.0 |
| Green traffic signal trans. (%) | 12.7 | 15.3 | 16.3 | 21.1 |
| ANSI Standard Z80.3 - 1997 | yes | yes | yes | yes. |

Table 6 shows the reflectance characteristics of the laminated sunglass lenses. As seen from the wearer-side reflectances, the sunglass lenses are indeed quite anti-reflective of side glare.

TABLE 6

Optical performance of the sunglass lenses in reflection.

| Sunglass lens reflectance | Silver | Gold | Blue | Copper |
|---|---|---|---|---|
| Front side | | | | |
| Luminous reflectance (%) | 15.4 | 11.0 | 17.8 | 5.6 |
| CIE coordinate (illuminant C), x | 0.32 | 0.35 | 0.23 | 0.35 |
| CIE coordinate (illuminant C), y | 0.33 | 0.37 | 0.23 | 0.34 |
| Wearer side | | | | |
| Luminous reflectance (%) | 0.98 | 1.3 | 1.2 | 1.8 |
| CIE coordinate (illuminant C), x | 0.22 | 0.23 | 0.22 | 0.24 |
| CIE coordinate (illuminant C), y | 0.20 | 0.21 | 0.25 | 0.22 |

EXAMPLE 4

Figure 9:
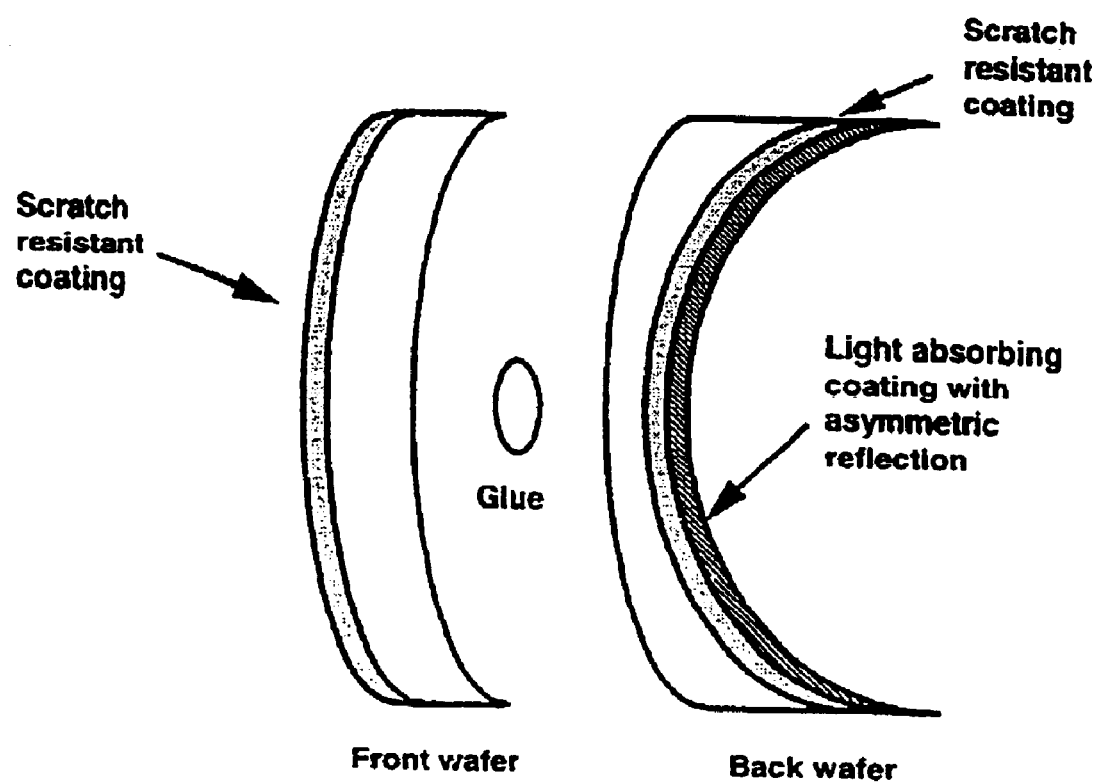
FIG. 9 illustrates an embodiment of a sunglass lens according to the present invention with the light absorbing coating on the outside surface of the back wafer.
Figure 10:
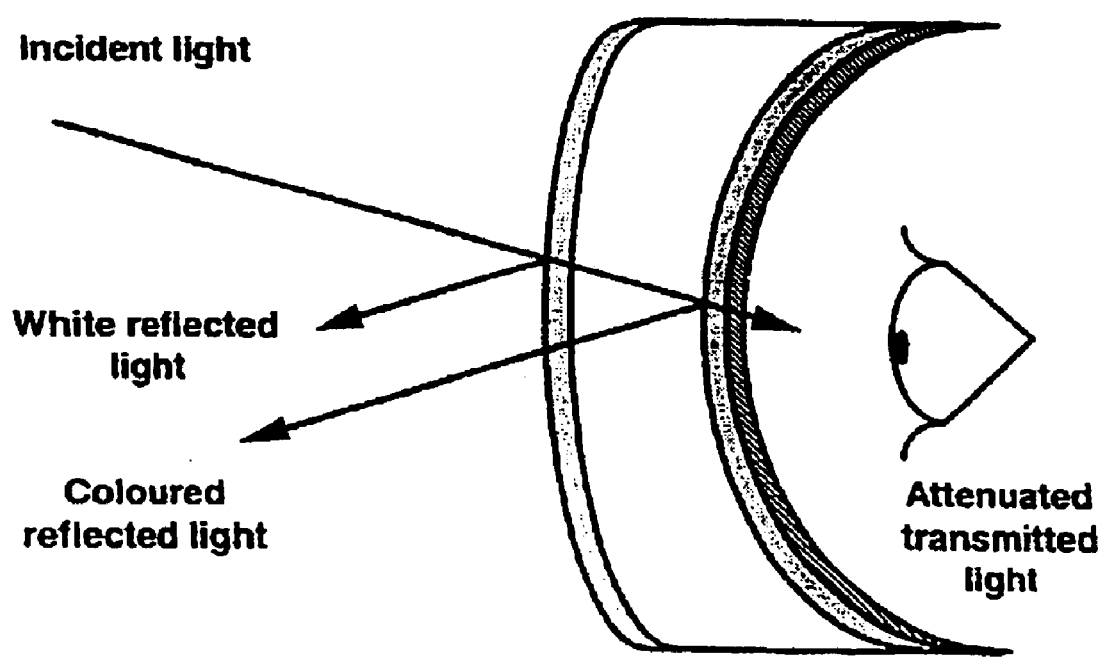
FIG. 10 illustrates the attenuation of transmitted light through the sunglass lens of FIG. 9 from a forward light source.
Figure 11:
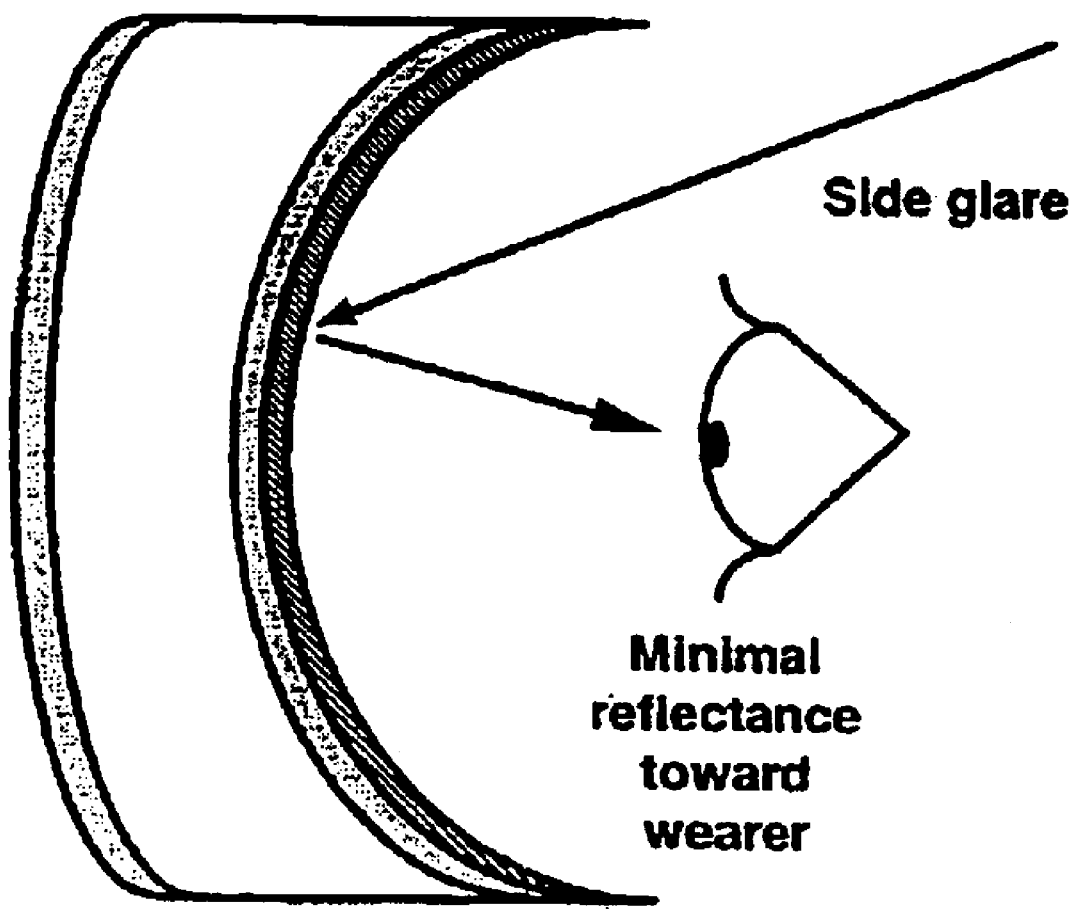
FIG. 11 illustrates the attenuation of reflected light from the sunglass lens of FIG. 8 from side glare.

Light Absorbing Coating on the Outside Surface of the Back Water of a Laminated Lens In the embodiment the light absorbing coating is deposited on the outside surface of the back wafer as in FIG. 9. In this embodiment of the present invention, no additional anti-reflective coating is required to minimise all back reflections to the eye of the wearer, as seen in FIG. 11. It will be appreciated that possible reflections from surfaces behind the light absorbing coating do not contribute in any significant manner, because their intensity is severely reduced by the incident light having initially passed through the light absorbing coating. Such reflections are therefore not indicated in the figure.

What is claimed is:

1. An optical lens comprising
a lens element; and
an asymmetric reflectance, light absorbing coating including at least four alternating layers of Silica ($SiO_2$) and Chromium (Cr), Niobium (Nb) or Zirconium (Zr) metal; and wherein the thickness and/or number of the respective layers are selected to provide an anti-reflective effect on the eye side of the optical lens and a desired colour on the other side of the optical lens, wherein the asymmetric reflectance, light absorbing coating includes alternating layers of silica and niobium metal and an additional niobium oxide ($Nb_2O_5$) and/or silica ($SiO_2$) layer of such thicknesses to provide a desired colour to the optical lens.

2. An optical lens comprising
a lens element; and
an asymmetric reflectance, light absorbing coating including at least four overlapping light absorbing and generally transparent layers, and wherein the thickness and/or number of the respective layers are selected to provide an anti-reflective effect on the eye side of the optical lens and a desired colour on the other side of the optical lens; and
wherein the asymmetric reflectance, right absorbing coating includes alternative layers of a dielectric material and a metallic material which is a metal or metal nitride, and
wherein a surface of the lens is subjected to a plasma treatment that improves adhesion thereto.

3. An optical lens according claim 2, wherein
the dielectric material is selected from one or more of $Al_2O_3$, $BaTiO_3$, $Bi_2O_3$, $B_2O_3$, $CeO_2$, $Cr_2O_3$, $Ga_2O_3$, $GeO_2$, $Fe_2O_3$, $HfO_2$, $In_2O_3$, Indium-tin oxide, $La_2O_3$, $MgO$, $Nd_2O_3$, $Nb_2O_5$, $Pr_2O_3$, $Sb_2O_3$, $Sc_2O_3$, $SiO$, $SiO_2$, $SnO_2$, $Ta_2O_5$, $TiO$, $TiO_2$, $Ti_2O_3$, $Ti_3O_5$, $WO_3$, $Y_2O_3$, $Yb_2O_3$, $ZnO$, $ZrO_2$; $AlF_3$, $BaF_2$, $CaF_2$, $CdF_2$, $CeF_3$, $HfF_4$, $LaF_3$, $LiF$, $MgF_2$, $NaF$, $Na_3AlF_6$, $Na_5Al_3Fl_{14}$, $NdF_3$, $PbF_2$, $PrF_3$, $SrF_2$, $ThF_4$, $ZrF_4$; $Si_3N_4$, $AlN$, or diamond-like carbon, and
the metallic material is selected from the metals, or metal nitrides of one or more of Silver (Ag), Aluminium (Al), Gold (Au), Barium (Ba), Boron (B), Cadmium (Cd), Cerium (Ce), Cobalt (Co), Chromium (Cr), Copper (Cu), Iron (Fe), Germanium (Ge), Hafnium (Hf), Indium (In), Iridium (Ir), Potassium (K), Lanthanum (La), Magnesium (Mg), Manganese (Mn), Molybdenum (Mo), Nickel (Ni), Neodymium (Nd), Niobium (Nb), Lead (Pb), Palladium (Pd), Platinum (Pt), Rhenium (Re), Antimony (Sb), Selenium (Se), Silicon (Si), Tin (Sn), Strontium (Sr), Tantalum (Ta), Titanium (Ti), Tellurium (Te), Thallium (Tl), Vanadium (V), Tungsten (N), Zinc (Zn) or Zirconium (Zr).

4. An optical lens according to claim 2, wherein the asymmetric reflectance, light absorbing coating further includes a compatible dielectric top layer or layers.

5. An optical lens according to claim 4, wherein the compatible dielectric layer or layers are of suitable material and thickness to provide a desired colour to the optical lens.

6. An optical lens according to claim 1, wherein a surface of the lens element bears a mark thereon, the mark being visible from the front surface of the optical lens, but not being visible from the eyeside thereof.

7. An optical lens, comprising
a lens element; and
an asymmetric reflectance, light absorbing coating including at least four overlapping light absorbing and generally transparent layers, and wherein the thickness and/or number of the respective layers are selected to provide an anti-reflective effect on the eye side of the optical lens and a desired colour on the other side of the optical lens; and
wherein the asymmetric reflectance, light absorbing coating includes alternative layers of a dielectric material and a metallic material which is a metal or metal nitride, wherein a surface of the lens element bears a mark thereon, the mark being visible from the front surface of the optical lens, but not being visible from the eyeside thereof, and
wherein the asymmetric reflectance, light absorbing coating is deposited on the surface bearing the mark, to render the mark substantially invisible from the eyeside of the lens.

8. An optical lens element comprising
a back lens wafer, said back lens wafer having
   a first concave lens surface; and
   a second convex lens surface,
the first surface having deposited thereon an asymmetric reflectance, light absorbing coating including at least four overlapping light absorbing and generally transparent layers, and wherein the thickness and/or number of the respective layers are selected to provide an anti-reflective effect on the eye side of the optical lens and a desired colour on the other side of the optical lens when formed as a laminate optical lens; and
wherein the asymmetric reflectance, light absorbing coating includes alternating layers of a dielectric material and a metallic material which is a metal or metal nitride.

9. An optical lens element according to claim 8 wherein
the dielectric material is selected from one or more of $Al_2O_3$, $BaTiO_3$, $Bi_2O_3$, $B_2O_3$, $CeO_2$, $Cr_2O_3$, $Ga_2O_3$, $GeO_2$, $Fe_2O_3$, $HfO_2$, $In_2O_3$, Indium-tin oxide, $La_2O_3$, MgO, $Nd_2O_3$, $Nb_2O_5$, $Pr_2O_3$, $Sb_2O_3$, $Sc_2O_3$, SiO, $SiO_2$, $SnO_2$, $Ta_2O_5$, TiO, $TiO_2$, $Ti_2O_3$, $Ti_3O_5$, $WO_3$, $Y_2O_3$, $Yb_2O3$, ZnO, $ZrO_2$; $AlF_3$, $BaF_2$, $CaF_2$, $CdF_2$, $CeF_3$, $HfF_4$, $LaF_3$, LiF, $MgF_2$, NaF, $Na_3AlF_6$, $Na_5Al_3Fl_{14}$, $NdF_3$, $PbF_2$, $PrF_3$, $SrF_2$, $ThF_4$, $ZrF_4$; $Si_3N_4$, AlN, or diamond-like carbon; and
the metallic material is selected from the metals, or metal nitrides of one or more of Silver (Ag), Aluminium (Al), Gold (Au), Barium (Ba), Boron (B), Cadmium (Cd), Cerium (Ce), Cobalt (Co), Chromium (Cr), Copper (Cu), Iron (Fe), Germanium (Ge), Hafnium (Hf), Indium (In), Iridium (Ir), Potassium (K), Lanthanum (La), Magnesium (Mg), Manganese (Mn), Molybdenum (Mo), Nickel (Ni), Neodymium (Nd), Niobium (Nb), Lead (Pb), Palladium (Pd), Platinum (Pt), Rhenium (Re), Antimony (Sb), Selenium (Se), Silicon (Si), Tin (Sn), Strontium (Sr), Tantalum (Ta), Titanium (Ti), Tellurium (Te), Thallium (Tl), Vanadium (V), Tungsten (W), Zinc (Zn) or Zirconium (Zr).

10. An optical lens element according to claim 8, wherein a surface of the lens wafer includes a roughened area on the surface to form a mark and the asymmetric reflectance light absorbing coating is deposited on the roughened surface.

11. A laminate optical lens comprising
a front lens wafer comprising
   a contact surface;
a complementary back lens wafer comprising
   a contact surface; and
an asymmetric reflectance, light absorbing coating deposited on a contact surface, which light absorbing coating includes at least four overlapping light absorbing and generally transparent layers, and wherein the thickness and/or number of the respective layers are selected to provide an anti-reflective effect on the eye side of the optical lens and a desired colour on the other side of the optical lens; and wherein the asymmetric reflectance, light absorbing coating includes alternating layers of a dielectric material and a metallic material which is a metal or metal nitride, wherein a contact surface of the front and/or back lens wafer bears a visible mark thereon, the mark being rendered substantially invisible from the eye side of the laminate lens when the lens wafer is bonded to its complementary wafer with a laminate adhesive having a refractive index approximately equal to that of the optical lens,
wherein the asymmetric reflectance light absorbing coating includes a silica top layer, the silica top layer bearing a mark visible prior to lamination of the wafers, and
wherein the visible mark is deposited on the silica top layer, the visible mark being formed from a laminate adhesive or polymeric material having a refractive index approximately equal to that of the silica layer.

12. A laminate optical lens according to claim 11, wherein the mark is visible from the front surface of the laminate lens.

13. A laminate optical lens according to claim 11, wherein the mark is a roughened area on the surface of the contact surface and the asymmetric reflectance light absorbing coating is deposited on the roughened contact surface.

14. A laminate optical lens according to claim 11 wherein the visible mark is etched into the silica top layer.

15. A laminate optical lens according to claim 11, wherein the laminated optical lens is of the semi-finished type.

16. A method for preparing an optical lens, including
a lens element; and
an asymmetric reflectance, light absorbing coating including at least four overlapping light absorbing and generally transparent layers, and wherein the thickness and/or number of the respective layers are selected to provide an anti-reflective effect on the eye side of the optical lens and a desired colour on the other side of the optical lens; and
wherein the asymmetric reflectance, light absorbing coating includes alternating layers of a dielectric material and a metallic material which is a metal or metal nitride, and wherein a surface of the lens is subjected to a plasma treatment that improves adhesion thereto;
which method includes
   providing
      a lens element,
      a dielectric material or materials; and
      a metallic material or materials; and
   depositing at least four overlapping layers of dielectric material and metallic material on a surface of the optical lens element, the number and/or thickness of the respective layers being selected to provide an asymmetric reflectance, light absorbing coating.

17. A method according to claim 16, wherein
the dielectric material is selected from one or more of $Al_2O_3$, $BaTiO_3$, $Bi_2O_3$, $B_2O_3$, $CeO_2$, $Cr_2O_3$, $Ga_2O_3$, $GeO_2$, $Fe_2O_3$, $HfO_2$, $In_2O_3$, Indium-tin oxide, $La_2O_3$, MgO, $Nd_2O_3$, $Nb_2O_5$, $Pr_2O_3$, $Sb_2O_3$, $Sc_2O_3$, SiO, $SiO_2$, $SnO_2$, $Ta_2O_5$, TiO, $TiO_2$, $Ti_2O_3$, $Ti_3O_5$, $WO_3$, $Y_2O_3$, $Yb_2O_3$, ZnO, $ZrO_2$; $AlF_3$, $BaF_2$, $CaF_2$, $CdF_2$, $CeF_3$, $HfF_4$, $LaF_3$, LiF, $MgF_2$, NaF, $Na_3AlF_6$, $Na_5Al_3Fl_{14}$, $NdF_3$, $PbF_2$, $PrF_3$, $SrF_2$, $ThF_4$, $ZrF_4$; $Si_3N_4$, AlN, or diamond-like carbon; and
the metallic material is selected from the metals, or metal nitrides of one or more of Silver (Ag), Aluminium (Al), Gold (Au), Barium (Ba), Boron (B), Cadmium (Cd), Cerium (Ce), Cobalt (Co), Chromium (Cr), Copper (Cu), Iron (Fe), Germanium (Ge), Hafnium (Hf), Indium (In), Iridium (Ir), Potassium (K), Lanthanum (La), Magnesium (Mg), Manganese (Mn), Molybdenum (Mo), Nickel (Ni), Neodymium (Nd), Niobium (Nb), Lead (Pb), Palladium (Pd), Platinum (Pt), Rhenium (Re), Antimony (Sb), Selenium (Se), Silicon (Si), Tin (Sn), Strontium (Sr), Tantalum (Ta), Titanium (Ti), Tellurium (Te), Thallium (Tl), Vanadium (V), Tungsten (W), Zinc (Zn) or Zirconium (Zr).

18. A method according to claim 16, wherein a surface of the optical lens bears a mark and the asymmetric reflectance light absorbing coating is deposited on the surface bearing the mark, such that the mark is visible from the front surface of the optical lens, but not being visible from the eyeside thereof.

19. A method according to claim 16, wherein the deposition step is a vacuum deposition step and is conducted in a box coater or sputter coating apparatus.

20. A method according to claim 16, wherein the lens element includes a front lens wafer including
   a contact surface,
   a complementary back lens wafer, including
      a contact surface
      and the overlapping layers of dielectric material and metallic material are deposited on a surface of the front and/or complementary back lens wafer.

21. A method according to claim 20, wherein the overlapping layers of dielectric material and metallic material are deposited on a contact surface of the front or complementary back lens wafer.

22. A method according to claim 21, wherein a laminate adhesive is applied to one or both contact surfaces, the front lens wafer and back lens wafer being brought into contact and the laminate so formed being subjected to a curing step to form a laminate optical lens.

23. A method according to claim 22, wherein the contact surface bearing the light absorbing coating bears a visible mark thereon;
   such that, when the laminate is bonded, the mark on the contact surface becomes substantially invisible to the wearer.

24. A method according to claim 22, wherein the top layer of the light absorbing coating is a silica layer bearing a visible mark thereon;
   the laminate adhesive having a similar refractive index to the silica layer such that, when the laminate is bonded, the mark on the silica surface becomes substantially invisible to the wearer.

25. An optical lens element comprising
   a front lens wafer, said front lens wafer having
      a first concave lens surface and
      a second convex lens surface
      the second surface having deposited thereon
         an asymmetric reflectance, light absorbing coating including at least four overlapping light absorbing and generally transparent layers, and wherein the thickness and/or number of the respective layers are selected to provide an anti-reflective effect on the eye side of the optical lens and a desired colour on the other side of the optical lens when formed as a laminate optical lens; and
      wherein the asymmetric reflectance, light absorbing coating includes alternating layers of dielectric material and a metallic material which is a metal or metal nitride.

26. An optical lens element according to claim 25, wherein the dielectric material is selected from one or more of $Al_2O_3$, $BaTiO_3$, $Bi_2O_3$, $B_2O_3$, $CeO_2$, $Cr_2O_3$, $Ga_2O_3$, $GeO_2$, $Fe_2O_3$, $HfO_2$, $In_2O_3$, Indium-tin oxide, $La_2O_3$, $MgO$, $Nd_2O_3$, $Nb_2O_5$, $Pr_2O_3$, $Sb_2O_3$, $Sc_2O_3$, $SiO$, $SiO_2$, $SnO_2$, $Ta_2O_5$, $TiO$, $TiO_2$, $Ti_2O_3$, $Ti_3O_5$, $WO_3$, $Y_2O_3$, $Yb_2O_3$, $ZnO$, $ZrO_2$; $AlF_3$, $BaF_2$, $CaF_2$, $CdF_2$, $CeF_3$, $HfF_4$, $LaF_3$, $LiF$, $MgF_2$, $NaF$, $Na_3AlF_6$, $Na_5Al_3Fl_{14}$, $NdF_3$, $PbF_2$, $PrF_3$, $SrF_2$, $ThF_4$, $ZrF_4$; $Si_3N_4$, AlN, or diamond-like carbon; and
   the metallic material is selected from the metals, or metal nitrides of one or more of Silver (Ag), Aluminium (Al), Gold (Au), Barium (Ba), Boron (B), Cadmium (Cd), Cerium (Ce), Cobalt (Co), Chromium (Cr), Copper (Cu), Iron (Fe), Germanium (Ge), Hafnium (Hf), Indium (In), Iridium (Ir), Potassium (K), Lanthanum (La), Magnesium (Mg), Manganese (Mn), Molybdenum (Mo), Nickel (Ni), Neodymium (Nd), Niobium (Nb), Lead (Pb), Palladium (Pd), Platinum (Pt), Rhenium (Re), Antimony (Sb), Selenium (Se), Silicon (Si), Tin (Sn), Strontium (Sr), Tantalum (Ta), Titanium (Ti), Tellurium (Te), Thallium (Tl), Vanadium (V), Tungsten (W), Zinc (Zn) or Zirconium (Zr).

27. An optical lens element according to claim 25, wherein a surface of the lens wafer includes a roughened area on the surface to form a mark and the asymmetric reflectance light absorbing coating is deposited on the roughened surface.

* * * * *